United States Patent
Ovens et al.

(10) Patent No.: US 10,230,451 B2
(45) Date of Patent: Mar. 12, 2019

(54) AIRBORNE CELLULAR COMMUNICATION SYSTEM

(71) Applicant: GE Aviation Systems LLC, Grand Rapids, MI (US)

(72) Inventors: Norman Leonard Ovens, Ada, MI (US); Gerald Les Vossler, Grand Rapids, MI (US); Otto Darias, Grand Rapids, MI (US); Grant Hazard, Grand Haven, MI (US); Samit Sura, Durham, NC (US)

(73) Assignee: GE Aviation Systems LLC, Grand Rapids, MI (US)

( * ) Notice: Subject to any disclaimer, the term of this patent is extended or adjusted under 35 U.S.C. 154(b) by 314 days.

(21) Appl. No.: 15/183,067

(22) Filed: Jun. 15, 2016

(65) Prior Publication Data
US 2017/0366250 A1    Dec. 21, 2017

(51) Int. Cl.
*H04B 7/185*   (2006.01)
*H01Q 1/28*    (2006.01)
(Continued)

(52) U.S. Cl.
CPC .......... *H04B 7/18506* (2013.01); *H01Q 1/28* (2013.01); *H01Q 3/26* (2013.01); *H04W 16/28* (2013.01); *H04W 64/003* (2013.01)

(58) Field of Classification Search
CPC ..... H04B 7/18506; H04B 7/10; H04W 16/28; H04W 64/003; H01Q 1/28; H01Q 3/26; H01Q 1/52; G01S 1/02
(Continued)

(56) References Cited

U.S. PATENT DOCUMENTS 5,444,762 A * 8/1995 Frey .............. H01Q 1/246
                                              343/713
6,816,728 B2   11/2004 Igloi et al.
(Continued)

FOREIGN PATENT DOCUMENTS

WO    WO02/17675 A2    2/2002

OTHER PUBLICATIONS

Extended European Search Report and Opinion issued in connection with corresponding EP Application No. 17176065.5 dated Nov. 8, 2017.

*Primary Examiner* — Harry K Liu
(74) *Attorney, Agent, or Firm* — GE Aviation Systems LLC; William Andes

(57) ABSTRACT

Systems and methods of providing cellular communication between an aircraft and infrastructure of ground communication nodes are provided. In one example, an avionics communication system located on an aircraft for providing cellular communication between the aircraft and an infrastructure of ground communication nodes includes a directional antenna, one or more processors and memory devices, as well as one or more radio transmitter/receivers. The radio transmitter/receiver can transmit and receive cellular communication signals along multiple communication paths established between the aircraft and one or more identified ground communication nodes using the directional antenna. Signal relay also can be implemented based in part on a determined signal power level, determined frequency shift compensation value for modifying communicated signals to account for expected Doppler effects and/or determined antenna beam steering commands.

20 Claims, 4 Drawing Sheets

(51) Int. Cl.
*H01Q 3/26* (2006.01)
*H04W 16/28* (2009.01)
*H04W 64/00* (2009.01)

(58) Field of Classification Search
USPC .......................................................... 342/367
See application file for complete search history.

(56) References Cited

U.S. PATENT DOCUMENTS

| | | |
|---|---|---|
| 8,145,208 B2 | 3/2012 | Chari et al. |
| 8,447,292 B2 | 5/2013 | Chari et al. |
| 8,547,277 B1 | 10/2013 | Mitchell |
| 2013/0324070 A1 | 12/2013 | Bennett et al. |
| 2014/0004853 A1 | 1/2014 | Mitchell |
| 2016/0080073 A1* | 3/2016 | Polehn .................. H04B 7/26 455/98 |
| 2016/0094309 A1* | 3/2016 | Mead Gill .............. H04K 3/60 455/1 |
| 2016/0119938 A1 | 4/2016 | Frerking et al. |

* cited by examiner

AIRBORNE CELLULAR COMMUNICATION SYSTEM

FIELD OF THE INVENTION

The present subject matter relates generally to technology for providing effective airborne cellular communications between an aircraft and infrastructure of ground communication nodes.

BACKGROUND OF THE INVENTION

Aircraft communication systems are increasingly relied upon for operational effectiveness and passenger connectivity. For example, the air-to-ground communications system known as ACARS (Aircraft Communications Addressing and Reporting System) is relied on for communicating numerous messages about relevant flight data including aircraft movement events and positional reporting, flight plans, take-off and landing confirmation, clearances, weather information, runway conditions, equipment health and maintenance, status of connecting flights, gate information, and the like. These messages may need to be communicated to numerous entities including air traffic control stations, national aviation authorities and operational control centers for different aircraft. Passengers also desire communication connectivity for accessing personal data and/or voice communication applications while airborne.

Conventional aircraft communication systems rely on radio and/or satellite equipment to accommodate the above communication functionality and more. Line of sight radio-based communication is often provided on either High Frequency (HF) radio waves (e.g., 3-30 MHz band) or Very High Frequency (VHF) radio waves (e.g., the 118-137 MHz section of the wider VHF range.) For communication using broadband functionality, satellite-based communication systems also may be utilized. However, airborne satellite communications can be costly and require special satellite transceiver equipment. A need remains for airborne broadband communication technology that can leverage available cellular systems to provide enhanced communication functionality without sacrificing cost or performance.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to an avionics communication system located on an aircraft for providing cellular communication between the aircraft and an infrastructure of ground communication nodes. The avionics communication system can include a directional antenna, one or more processors and one or more memory devices, as well as one or more radio transmitter/receivers. The one or more memory devices can store instructions that when executed by the one or more processors cause the one or more processors to perform operations. The operations can include identifying one or more ground communication nodes with which the aircraft plans to communicate in a given period of time. The operations also can include determining a signal power level for communicating between the aircraft and the one or more identified ground communication nodes. The operations also can include determining a frequency shift value for modifying communicated signals to account for expected Doppler effects associated with the communicated signals due to a velocity of the aircraft relative to the identified one or more ground communication nodes. The radio transmitter/receiver can be configured to transmit and receive cellular communication signals between the aircraft and the identified one or more ground communication nodes using the directional antenna, determined signal power level and determined frequency shift value.

Another example aspect of the present disclosure is directed to a computer-implemented method of providing cellular communication between an aircraft and infrastructure of ground communication nodes. The method can include identifying, by one or more computing devices, one or more ground communication nodes with which the aircraft plans to communicate in a given period of time. The method also can include determining, by the one or more computing devices, a signal power level for communicating between the aircraft and the one or more identified ground communication nodes. The method also can include determining, by the one or more computing devices, a frequency shift value for modifying communicated signals to account for expected Doppler effects associated with the communicated signals due to a velocity of the aircraft relative to the identified one or more ground communication nodes. The method can still further include transmitting or receiving cellular communication signals between the aircraft and the identified one or more ground communication nodes using the determined signal power level and determined frequency shift value.

Yet another example aspect of the present disclosure is directed to an aircraft. The aircraft can include a directional antenna, one or more processors and one or more memory devices, and a radio transmitter/receiver. The one or more memory devices can store instructions that when executed by the one or more processors cause the one or more processors to perform operations. The operations can include identifying one or more ground communication nodes with which the aircraft plans to communicate in a given period of time. The operations also can include determining a signal power level for communicating between the aircraft and the one or more identified ground communication nodes. The operations also can include determining a frequency shift value for modifying communicated signals to account for expected Doppler effects associated with the communicated signals due to a velocity of the aircraft relative to the identified one or more ground communication nodes. The operations also can include determining an antenna beam steering command for the directional antenna. The antenna beam steering command can be based at least in part on the relative position of the aircraft to the identified one or more ground communication nodes with which the aircraft plans to communicate in the given period of time. The radio transmitter/receiver can be configured to transmit and receive cellular communication signals between the aircraft and the identified one or more ground communication nodes using the directional antenna, determined signal power level, determined frequency shift value, and determined antenna beam steering command.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
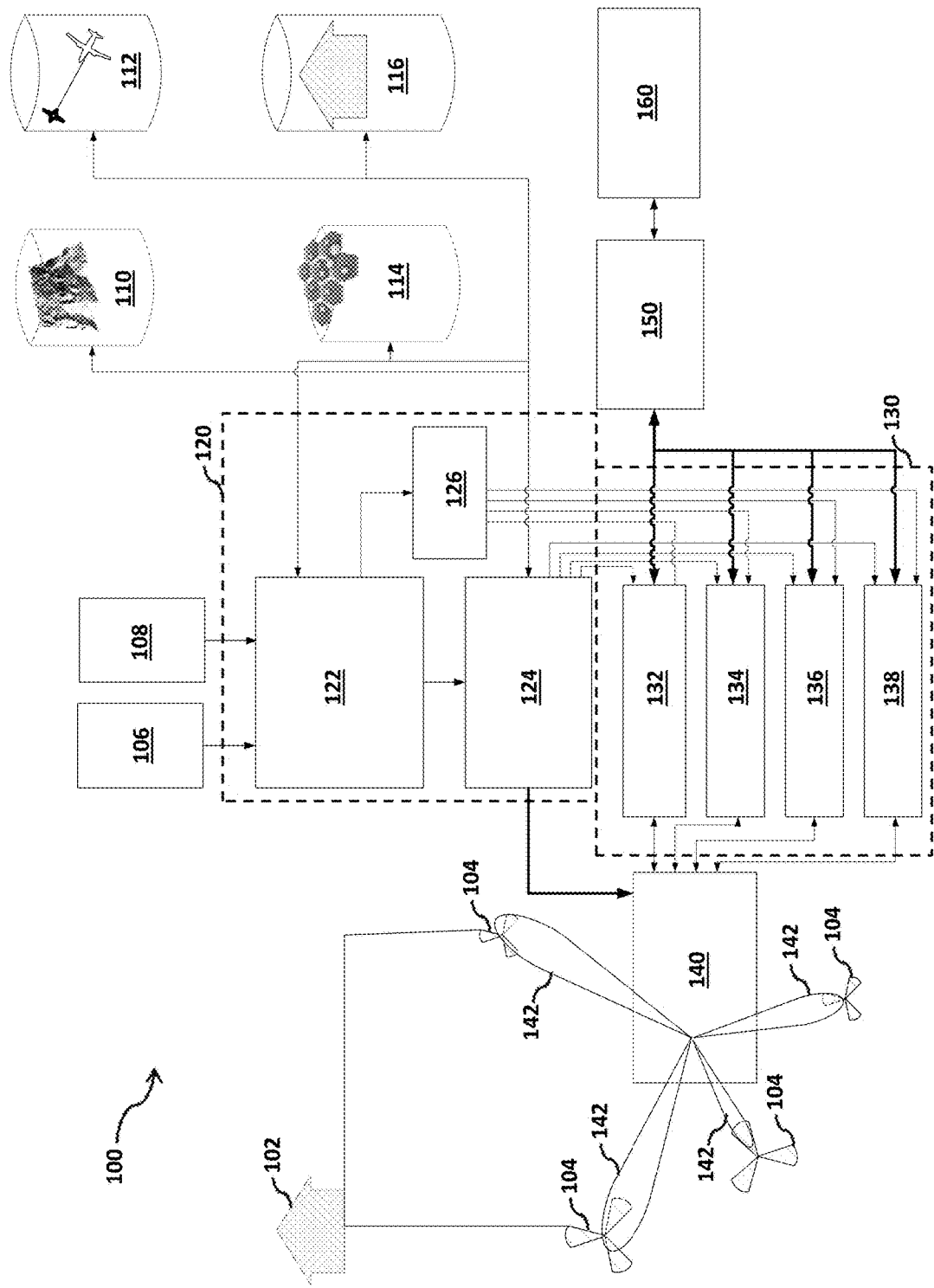
FIG. 1 depicts an overview of an example avionics communication system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for providing cellular communication between an aircraft and an infrastructure of ground communication nodes (e.g., cellular towers, ground stations and the like.) Example system components can include one or more radio transmitter/receivers coupled with a directional antenna that are collectively configured to relay cellular communication signals between the aircraft and the identified one or more ground communication nodes. One or more onboard computing devices including one or more processors and one or more memory devices can be configured to perform a series of computational operations. For instance, operations can include identifying one or more ground communication nodes with which the aircraft plans to communicate in a given period of time. A signal power level for communicating between the aircraft and the one or more ground communication nodes can be determined, as well as a frequency shift value for modifying communicated signals to account for expected Doppler effects associated with the communicated signals due to a velocity of the aircraft relative to the identified one or more ground communication nodes. An antenna beam steering command also can be determined based at least in part on a relative position of the aircraft to the identified one or more ground communication nodes. Transmission and reception of signals between the aircraft and identified ground communication nodes can be implemented in accordance with one or more of the determined signal power level (or signal gain), determined frequency shift, and determined antenna beam steering command.

Identification of which ground communication nodes an aircraft plans to communicate with in respective given periods of time can include a determination based in part on one or more specific data variables, including a position of the aircraft, relative velocity of the aircraft, ground communication node data and/or terrain characteristics along an aircraft flight path. Aircraft position can include lateral and vertical position data available from sources such as but not limited to flight plans and/or navigation sensors provided as part of an aircraft navigation system. Ground communication node data can include location, capacity level, communication protocol type, and/or state of availability for a plurality of known ground communication nodes.

The disclosed systems and methods can have a technical effect of leveraging existing ground-based commercial cell phone infrastructure to provide cost-effective, high-speed, and reliable airborne cellular communications for aircraft operations and passenger use both in flight and on the ground. This technical effect can be achieved at least in part by emulating the characteristics of a conventional cellular node from relatively long range, high altitudes and velocities than conventional cellular systems are traditionally designed to accommodate. By adapting aircraft systems to leverage an existing terrestrial cellular infrastructure, bandwidth can be acquired at a substantially lower cost compared with satellite communication links having a comparable capacity. Reliable cellular connectivity to ensure safe operation and effective communication for an aircraft can be provided at least in part through multiple redundant communication paths.

The disclosed systems and methods also can have a technical effect of solving potential problems that could be encountered by a system attempting to utilize commercial cell phone infrastructure from a high speed airborne vehicle. Provision of a directional steered beam antenna to reduce multipath signal propagation arriving at the transmitter and/or receiver components of an aircraft communications node can be provided to address potential problems due to Rician fading. Multiple redundant communication channels as well as data defining obstacles and terrain around selected cellular towers within an airborne communication path to confirm line of sight communication can help address potential issues with Rayleigh fading due to obstacles and terrain. Multiple redundant communication channels also can help address potential blocking concerns whereby a high-power transmitter can block out entire ranges of communication channels. Redundant communication paths from an aircraft to multiple cell towers coupled with increased transmit power, antenna gain and/or receiver sensitivity can help alleviate potential problems arising from loss of a cellular signal. Computational corrections can be applied to received and/or transmitted signals to compensate for Doppler frequency shift effects on the communications that occur due to the high speed velocity of an aircraft relative to one or more ground nodes.

FIG. 1 depicts an example avionics communication system 100 for providing cellular communication between an aircraft and an infrastructure of ground communication nodes. The infrastructure of ground communication nodes can include components of a cellular system, including but not limited to a plurality of ground stations 102 and cellular (cell) towers 104. Ground stations 102 can include system components such as but not limited to transceivers configured to enable the transmission and reception of radio signals, signal amplifiers, combiners and system controllers. One or more cellular towers 104 can be communicatively coupled with each ground station 102 and can be configured to elevate antennas that transmit and receive radio-frequency (RF) signals from other communication nodes, including mobile phones and devices. The ground-based cellular infrastructure including ground stations 102 and cellular towers 104 are assumed to be a commercially available and existing system that is designed to work primarily for coordinating ground-based cellular communication among mobile nodes.

Avionics communication system 100 is designed to adapt a mobile airborne communication node such as one onboard an aircraft operating from longer ranges and higher altitudes and velocities than most ground-based mobile nodes for use with the cellular infrastructure of ground stations 102 and cellular towers 104. It should be appreciated that some embodiments of an avionics communication system 100 can be designed to work with customized cellular infrastructure that is specifically designed for airborne communications. However, modifications to an existing cellular infrastructure are not necessarily required for effective operation of exemplary embodiments of the disclosed technology.

Avionics communication system 100 can include a plurality of integrated components, including one or more navigation sensors 106, one or more aircraft velocity sensors 108, one or more databases 110-116, one or more computing devices hosting a computational platform 120 for executing software-based operations, one or more radio transceivers 130, one or more antennas 140, one or more digital communication gateways 150 and aircraft systems 160.

The one or more navigation sensors 106 can include components such as but not limited to accelerometers, gyroscopes, Global Positioning System (GPS) devices or other motion sensing or location sensing devices configured to determine positional information for an aircraft. The one or more aircraft velocity sensors can include speed sensors, radar devices, pitot tubes, Doppler velocity sensors or other devices configured to determine relative velocity of an aircraft while in operation. Data obtained from the one or more navigation sensors 106 and one or more aircraft velocity sensors 108 can be relayed to computational platform 120 in order to determine various parameters such as aircraft position, relative velocity and selection of one or more cell towers or other ground communication nodes with which the aircraft plans to communicate in various periods of time.

A plurality of databases 110-116 can be provided locally onboard the aircraft or can be accessible from a remote location by avionics communication system 100. Ground communication nodes with which an aircraft plans to communicate can be selected at least in part based on data available from the plurality of databases 110-116, including but not limited to data defining proximity, line of sight availability, power, protocol, and current availability of various ground communication nodes located relative to the aircraft. Although four separate databases 110-116 are depicted as part of avionics communication system 100, the data stored in such databases can be stored in different configurations such as in a single database stored in a single location or distributed across multiple local and/or remote locations.

Terrain database 110 can include information identifying and/or characterizing terrain characteristics between the aircraft and the identified one or more ground communication nodes (e.g., ground stations 102 and cell towers 104). Terrain characteristics can include a digital elevation model consisting of a high-resolution sampled array of elevations for ground positions at regularly spaced intervals. Such a digital elevation model can store terrain data points in a latitude, longitude, altitude/elevation format or any other manner for suitable correlation of lateral terrain locations with corresponding vertical terrain elevations. Terrain characteristics also can include data identifying various natural or manmade obstacles along a ground surface, including data defining the lateral location and vertical elevation of any such obstacles. By providing detailed information about terrain characteristics, proposed communication paths between an aircraft and identified ground communication nodes can be analyzed to confirm line of sight communication paths and identify instances where other communication paths may be needed for effective cellular communication.

Flight plan database 112 can include information that tracks the planned and/or actual location of an aircraft between a start location and end location, including lateral and vertical position data defining aircraft location or position. For planned routes, flight plan database can include aircraft position data relative to one or more waypoints between start and end locations. For actual routes, flight plan database can store data received from a flight control computer that, among other things, can automate the tasks of piloting and tracking the flight plan of an aircraft.

Cell network database 114 and ground station database 116 can provide detailed information about ground communication nodes within an existing cellular infrastructure. Cell network database 114 can provide information about ground communication nodes such as cell towers 104, while ground station database 116 can provide information about ground communication nodes such as ground stations 102. In general, the data provided within cell network database 114 and ground station database 116 can include a location of each ground communication node, a capacity level associated with each ground communication node, a communication protocol type associated with each ground communication node (e.g., specific frequency bands, CDMA specifications, etc.) and a state of availability of each ground communication node.

Referring still to FIG. 1, the data available from navigation sensors 106, aircraft velocity sensors 108, terrain database 110, flight plan database 112, cell network database 114 and ground station database 116 can be provided to one or more computing devices hosting computational platform 120 for executing various software-based operations included in the disclosed embodiments. For example, computational platform 120 can include a first computational algorithm 122 for determining aircraft position, aircraft relative velocity and ground node selections. Computational platform 120 also can include a second computational algorithm 124 for determining antenna direction or other aspects of antenna beam steering commands, signal power levels, gain levels and/or sensitivity levels. Computational platform 120 also can include a third computational algorithm 126 for determining frequency shift values for modifying communicated signals to account for expected Doppler effects associated with the communicated signals due to a velocity of the aircraft relative to the identified one or more ground communication nodes. Computational platform 120 can include additional or alternative computational algorithms or modular components for computing various specific parameters according to the disclosed technology.

Communication signals can be relayed between an aircraft and various cell towers or other selected ground communication nodes using one or more transceivers 130, directional antenna 140, digital communications network gateway 150 and aircraft systems 160. Signal transmission and reception can be implemented based on the different communication parameters determined by computational platform 120, including but not limited to the identified one or more ground communication nodes, determined antenna beam steering command, determined signal power level and determined frequency shift value.

The one or more transceivers 130 can be configured to establish one or more communication paths 132, 134, 136 and 138 for transmitting and receiving cellular signals. In some examples, transceivers 130 can be digital communication radios operating in the 800 MHz to 5.5 GHz RF spectrum and having sufficient transmit power and receiver sensitivity to support communication links over a 100 mile line of sight range. This can enable transceivers 130 to establish communication paths with ground communication nodes that are 100 miles from an aircraft while the aircraft is traveling up to 25,000 feet in altitude. Each communication path 132-138 can represent communication with a different ground communication node or different paths to a same node using different protocols. Provision of multiple parallel communication paths 132-138 using multiple connections to several cell towers or dissimilar services hosted on the same physical cell tower can help avoid potential disruption of communications by independent random signal loss or other failures of communication equipment. In some examples, multiple communication paths 132-138 can be designed to function using different cellular protocols and signal bands (e.g., Wi-Fi, WiMax, CDMA (3G), LTE (4G), etc.)

Directional antenna 140 can include a steered beam antenna such as a phased array antenna or other antenna that can be oriented in particular directions (e.g., specified pitch and yaw angles) based on the selected ground communication nodes with which the aircraft plans to communicate. Directional antenna 140 can be configured to radiate multiple antenna patterns defined by respective signal strength and direction in a given period of time for multiple communication paths. For example, FIG. 1 depicts directional antenna 140 configured to radiate four different antenna patterns 142 for establishing communication paths with four respective cell towers 104. Directional antenna 140 can thus be capable of steering multiple beams concurrently and conducting digital communications over parallel links with multiple cell towers. Although only a single directional antenna is depicted in FIG. 1, avionics communication system also can include additional antennas, such as an omni-directional antenna for communicating with ground communication nodes when the aircraft is on the ground or in other short-range, low-altitude or traditional cellular communication environments.

Digital network communications gateway 150 can provide networking hardware and/or software components for interfacing the aircraft systems 160 and transceivers 130 with the cellular network embodied by ground communication nodes such as ground stations 102 and cell towers 104. Digital network communications gateway 150 can include one or more devices such as but not limited to protocol translators, impedance matching devices, rate converters, fault isolators, or signal translators as necessary to provide cellular system interoperability for avionics communication system 100.

Figure 2:
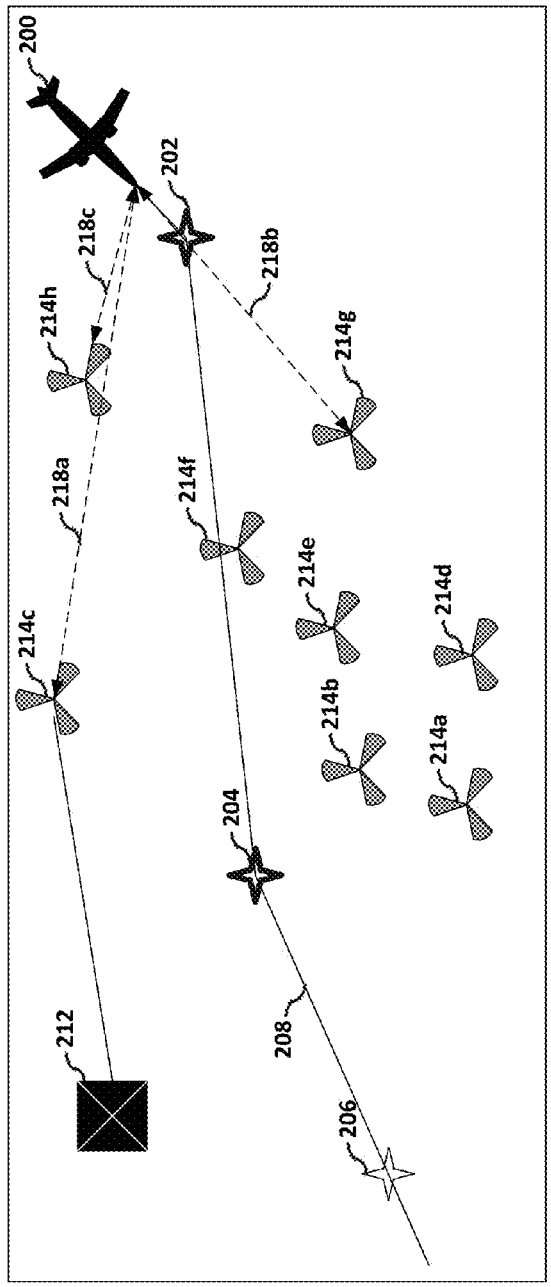
FIG. 2 provides a plan view of example location data for an aircraft, ground communication nodes and terrain utilized by an avionics communication system according to example embodiments of the present disclosure.
Figure 3:
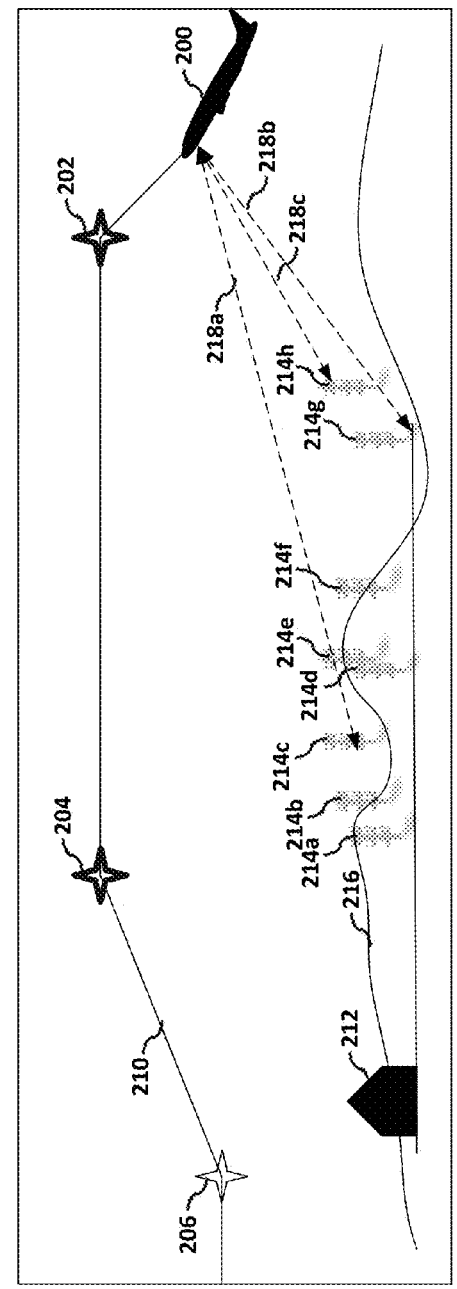
FIG. 3 provides a vertical view of example location data for an aircraft, ground communication nodes and terrain utilized by an avionics communication system according to example embodiments of the present disclosure.

FIG. 2 and FIG. 3 provide complementary views of example location data for an aircraft, ground communication nodes and terrain utilized by an avionics communication system 100 such as depicted in FIG. 1. FIG. 2 depicts a plan view while FIG. 3 depicts a vertical view of an aircraft 200 traveling on a flight path from a start location through a first waypoint 202, second waypoint 204 and third waypoint 206 en route to an end location. FIG. 2 depicts the lateral flight path 208 of aircraft 200, while FIG. 3 depicts a vertical flight path 210 of aircraft 200, both corresponding to the same flight plan for aircraft 200. Location data defining the lateral flight path 208 and vertical flight path 210 of aircraft 200 can be accessed from flight plan database 112, navigation sensors 106 or other source of aircraft position data.

Referring still to FIGS. 2 and 3, location data accessed from cell network database 114 and/or ground station database 116 of FIG. 1 or other source of ground communication node locations can identify the location of one or more ground stations 212 and cell towers 214a-214h located relative to the flight path 208/210 of aircraft 200. Location data accessed from terrain database 110 of FIG. 1 or other source of terrain locations can identify terrain characteristics such as depicted by the positional layout of terrain 216 depicted in FIG. 3 or any obstacles located on or associated with terrain 216. Based on the relative locations among the aircraft 200, identified nearby ground communication nodes including ground station 212 and cell towers 214a-214h and terrain 216 at the depicted given instance or period of time, one or more ground communication nodes can be identified with which the aircraft 200 plans to communicate. In one example, cell towers 214c, 214g and 214h are identified as the ground communication nodes with which aircraft 200 plans to communicate in the given period of time depicted in FIGS. 2 and 3. This establishes at least three communication paths for simultaneous aircraft communication including first communication path 218a between aircraft 200 and cell tower 214c, second communication path 218b between aircraft 200 and cell tower 214g, and third communication path 218c between aircraft 200 and cell tower 214h.

Figure 4:
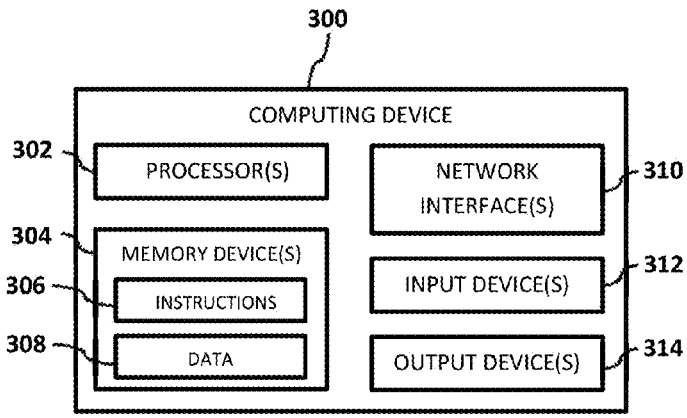
FIG. 4 depicts components of an example computing system implemented onboard an aircraft according to example embodiments of the present disclosure.

FIG. 4 depicts components of an example computing system implemented onboard an aircraft according to example embodiments of the present disclosure. The computing system can include one or more computing device(s) 300 for performing the functions implemented by computational platform 120 of FIG. 1. Each computing device 300 can include one or more processors 302 and one or more memory devices 304. The one or more processors 302 can include any suitable processing device, such as a microprocessor, microcontroller, integrated circuit, logic device, or other suitable processing device. The one or more memory devices 304 can include one or more computer-readable media, including, but not limited to, non-transitory computer-readable media, RAM, ROM, hard drives, flash drives, or other memory devices.

The one or more memory devices 304 can store information accessible by the one or more processors 302, including computer-readable instructions 306 that can be executed by the one or more processors 302. The instructions 306 can be any set of instructions that when executed by the one or more processors 302, cause the one or more processors 302 to perform operations. The instructions 306 can be written in any suitable programming language or can be implemented in hardware. In some embodiments, the instructions 306 can be executed by the one or more processors 302 to cause the one or more processors to perform operations, such as the operations for providing airborne cellular communications described with reference to FIGS. 5 and 6. The memory devices 304 can further store data 308 that can be accessed by the processors 302. The data 308 can include, for instance, data stored within databases 110-116, obtained by navigation sensors 106 and/or aircraft velocity sensors 108, computations determined by computation platform 120, and the like.

Each computing device 300 also can include one or more network interfaces 310 for linking the computing device to one or more navigation systems, aircraft systems, flight control computers, or other electronic aircraft components via a data bus or combination of wired and/or wireless communication links. A flight control computer coupled to computing device 300 can, among other things, automate the tasks of piloting and tracking the flight plan of the aircraft 102. The flight control computer 130 can include or be associated with, any suitable number of individual microprocessors, power supplies, storage devices, interface cards, auto flight systems, flight management computers, and other standard components. The flight control computer 130 can include or cooperate with any number of software programs (e.g., flight management programs) or instructions designed to carry out the various methods, process tasks, calculations, and control/display functions necessary for operation of the aircraft 130. In some examples, a flight control computer also can be included with or implemented by the computing device(s) 104.

Network interface 310 also can enable computing device 300 to be in communication with various aircraft systems, including but not limited to aircraft propulsion systems, digital control systems, throttle systems, inertial reference systems, flight instrument systems, engine control systems, auxiliary power systems, fuel monitoring system, engine vibration monitoring systems, communications systems, flap control systems, flight data acquisition systems, and other systems. The aircraft systems can provide various operating parameters to the computing device(s) 300 for use in determining communication signal computations according to example embodiments of the present disclosure.

Each computing device also can include one or more input devices 312 and one or more output devices 314. An input device 312 can include a keyboard, touchscreen, interface panel, microphone, eye controller, or other device capable of receiving instructions from an operator of an aircraft. Output device can include a display, speaker or other device configured to provide information generated or received by the computing device 300. In some examples, output device 314 can include a primary flight display, a multipurpose control display unit, or other suitable flight display commonly included within a cockpit of an aircraft. By way of non-limiting example, an output device 314 can be used for displaying communication information such as selected ground communication nodes, determined communication parameters, types of planned or established communication paths and the like.

Figure 5:
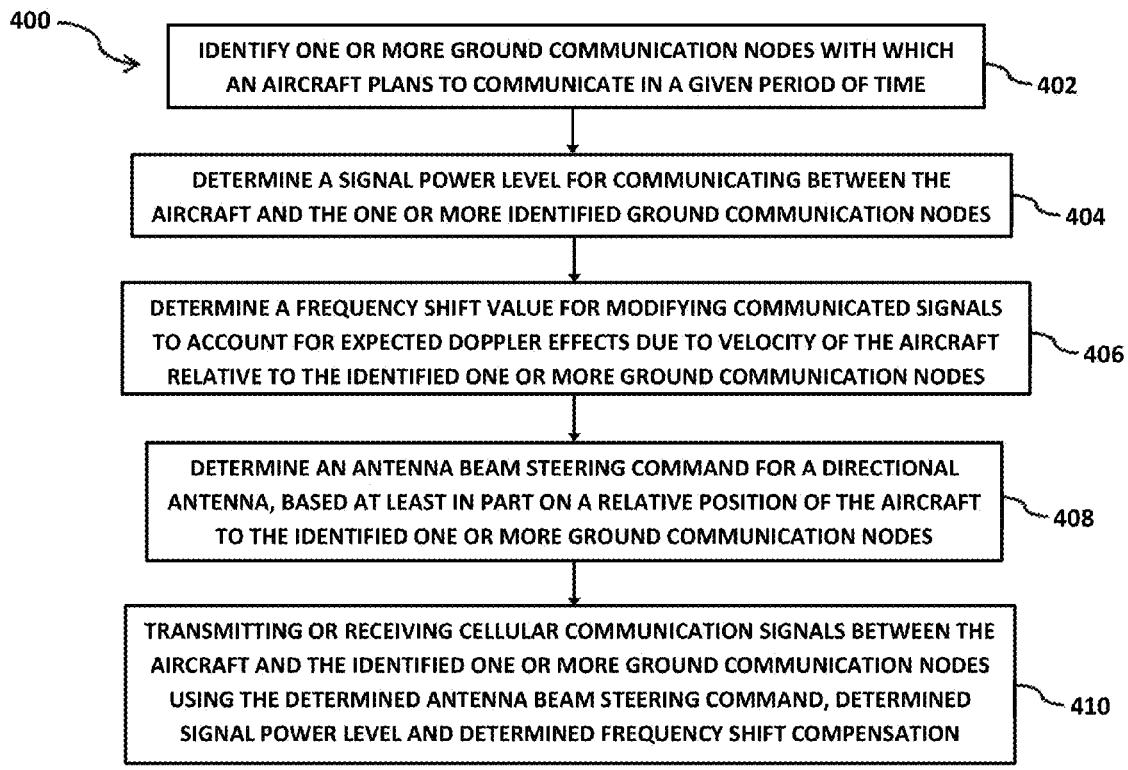
FIG. 5 provides a flow chart of an example method for providing cellular communication between an aircraft and infrastructure of ground communication nodes according to example embodiments of the present disclosure.
Figure 6:
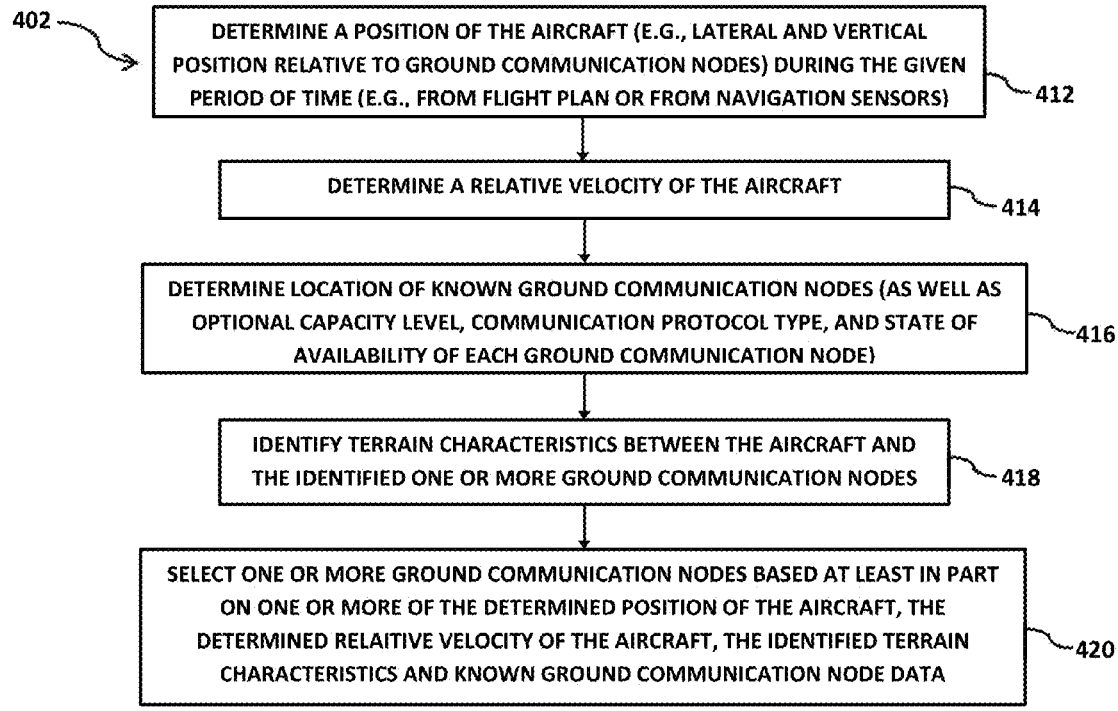
FIG. 6 provides a flow chart of an example method for identifying one or more ground communication nodes with which an aircraft plans to communicate in a given period of time according to example embodiments of the present disclosure.

FIGS. 5 and 6 depict flow diagrams of respective aspects of an example method (400) of providing cellular communication between an aircraft and infrastructure of ground communication nodes according to example embodiments of the present disclosure. FIGS. 5 and 6 can be implemented by one or more computing devices, such as the computing device(s) 300 depicted in FIG. 4. In addition, FIGS. 5 and 6 depict steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

FIG. 5 depicts a flow diagram of an example method (400) of providing cellular communication between an aircraft and infrastructure of ground communication nodes. Method (400) can include identifying (402) one or more ground communication nodes with which the aircraft plans to communicate in a given period of time. The ground communication nodes identified at (402) can include one or more cell towers such as depicted in FIGS. 1-3. In some examples, identifying one or more ground communication nodes at (402) includes identifying a plurality of ground communication nodes with which the aircraft plans to communicate in a given period of time such that multiple redundant communication paths are established between the aircraft and the one or more ground communication nodes. An example of this can involve an aircraft establishing multiple communication paths with multiple cell towers as depicted in FIG. 1 with different signal paths to the four respective cell towers 104 or as depicted in FIGS. 2 and 3 with different signal paths 218a, 218b and 218c for different cell towers 214c, 214g and 214h. In other examples, identifying one or more ground communication nodes at (402) includes identifying at least one ground communication node with which multiple connections will be established using one or more different cellular communication protocols such that multiple redundant communication paths are established between the aircraft and the one or more ground communication nodes. An example of this approach can involve identifying a given cell tower to establish a first communication path by a first protocol such as CDMA (3G) and a second communication path by a second protocol such as LTE (4G). Although an aircraft might only communicate with a single cell tower in a given period of time, multiple redundant communication paths can be established by using different communication protocols and signal connections with the same cell tower. More specific aspects of identifying the one or more ground communication nodes at (402) are discussed with reference to FIG. 6.

Method (400) of FIG. 5 also can include determining (404) a signal power level for communicating between the aircraft and the one or more identified ground communication nodes. Determining a signal power level at (404) can be based at least in part on one or more of a determined distance between the aircraft and each of the identified one or more ground communication nodes with which the aircraft plans to communicate in the given period of time, a type of cellular technology used in communication, and an estimated amount of antenna gain estimated due to the relative position of the aircraft to selected cell tower antennas and their respective predicted antenna radiation patterns. Proper determination of the signal power level at (404) can adapt an avionics communication system so that it is adequate for the specific range between the airborne vehicle and selected ground communication nodes. This can advantageously help the avionics communication system avoid interference with normal operations of the cell towers.

Method (400) also can include determining (406) a frequency shift value for modifying communicated signals to account for expected Doppler effects associated with the communicated signals due to a velocity of the aircraft relative to the identified one or more ground communication nodes. As such, the disclosed avionics communication system can compensate for Doppler frequency shift effects on the communications that occur due to the relative velocity of the aircraft to a ground node caused by the high speed movement of the airborne vehicle. The relative velocity of the aircraft relative to the selected cell towers will be calculated and the Doppler frequency shift will be applied to transmitted RF signals. Doppler effect on the received signal paths also can be anticipated and applied to the received signals to allow for high velocity (e.g., 450 knots ground speed) use of the path.

Figure 7:
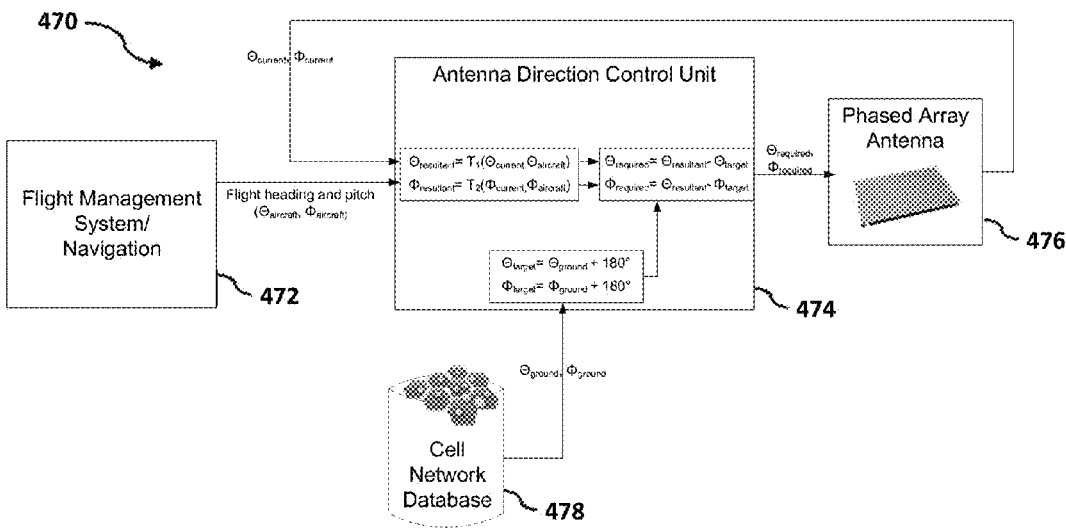
FIG. 7 depicts an example antenna control system for determining an antenna beam steering command for a directional antenna according to example embodiments of the present disclosure.

Method (400) also can include determining (408) an antenna beam steering command for a directional antenna, such as the directional antenna 140 depicted in FIG. 1 or the phased array antenna 476 of FIG. 7. The antenna beam steering command determined at (408) can be based at least in part on the relative position of the aircraft to antennas mounted on the identified one or more ground communication nodes with which the aircraft plans to communicate in the given period of time as well as the relative current position of the directional antenna. The relative positions of the aircraft, directional antenna and ground communication node antennas can be described relative to orientation angles, including a respective pitch angle and yaw angle for each component. The antenna beam steering command determined at (408) can correspond to a required antenna pitch angle and required antenna yaw angle determined relative to the known current orientation angles for the antenna, aircraft and cell tower antennas. More particular aspects of determining an antenna beam steering command at (408) are discussed relative to an antenna control unit 470 of FIG. 7.

Method (400) also can include relaying cellular communication signals at (410). Relaying communication signals at (410) can more particularly include transmitting or receiving cellular communication signals between the aircraft and the one or more ground communication nodes identified at (402). The format of signals transmitted and received at (410) can be structured in accordance with one or more of the signal power level determined at (404), the frequency shift value determined at (406) and/or the antenna beam steering command determined at (408).

Referring now to FIG. 6, more particular aspects of identifying (402) one or more ground communication nodes with which the aircraft plans to communicate in a given period of time are described. Identifying one or more ground communication nodes at (402) can include determining (412) a position of the aircraft during the given period of time. Aircraft position can be defined in terms of a lateral and vertical position of an aircraft, such as depicted by lateral flight path 208 of FIG. 2 and vertical flight path 210 of FIG. 3. In some examples, determining (412) a position of the aircraft during a given period of time can include receiving aircraft position signals from an aircraft navigation system, such as the navigation sensors 106 depicted in FIG. 1. In other examples, determining (412) a position of the aircraft during a given period of time can include determining aircraft position by accessing a predetermined flight plan for the aircraft, such as might be available from flight plan data stored in flight plan database 112 depicted in FIG. 1.

Identifying one or more ground communication nodes at (402) also can include determining a relative velocity of the aircraft at (414), determining location and other data parameters associated with ground communication nodes at (416), and/or determining terrain characteristics at (418). In some examples, velocity can be determined from aircraft velocity sensors 108 such as depicted in FIG. 1. In other examples, an expected aircraft velocity can be determined from flight plan data available from flight plan database 112. A database of known ground communication nodes, such as cell towers and ground stations can be accessed at (416) in order to identify data associated with the ground communication nodes, including but not limited to a location of each ground communication node, a capacity level associated with each ground communication node, a communication protocol type associated with each ground communication node, a state of availability of each ground communication node, and current orientation for antennas located at each ground communication node. Antenna radiation angles and patterns can be identified exactly from information available from a communication node provider, or such data can be determined based on information that is available about the equipment installed at each ground communication node. Ground communication node data accessed at (416) can include information stored in cell network database 114 and/or ground station database 116 of FIG. 1. Identifying terrain characteristics at (418) can include analyzing terrain and related obstacles between an aircraft and one or more ground communication nodes with which the aircraft may potentially communicate in a given period of time in order to determine whether a line of sight communication path exists or whether terrain or obstacles could block that potential path. Terrain characteristics determined at (418) can include information stored in terrain database 110 of FIG. 1.

After determining one or more factors at (412), (414), (416) and (418), the determined factors can be used at least in part for the selection of one or more ground communication nodes at (420). Selection at (420) can be based at least in part on one or more of the determined position of the aircraft, the determined relative velocity of the aircraft, the location of ground communication nodes, and location of identified terrain characteristics. In general, selection at (420) can identify ground communication nodes that are closest in geographical location to an aircraft at each given period of time. Preference can be given to selecting ground communication nodes that will be in a proximal location in light of the aircraft's forward travel so that communication paths can be established with selected ground communication nodes that will remain in an aircraft's line of sight for some period of time. As an aircraft continues travel along its intended flight path, new ground communication nodes will be selected and communication paths for transmitting and receiving cellular signals can be established with the new ground communication nodes before connectivity with currently selected ground communication nodes is terminated. This provides a make-before-break connectivity protocol that will ensure an overlap of communication paths to help minimize potential disruption or unavailability of cellular signal relay. As different ground communication nodes are selected at (420) for different given periods of time, rapid connection protocols and use of multiple channel communications can be used to help facilitate the transition between cell towers. Tiered communication technologies that are constantly evaluated for quality, bandwidth, signal to noise ratio and/or other signal parameters can be analyzed in order to consistently select ground communication nodes at (420) that can result in signal paths that are most likely to result in effective and reliable cellular connection. Analysis of the intended use of a communication path (e.g., for voice, data, etc.) also can be considered to help select desired ground communication nodes at (420).

Referring now to FIG. 7, example antenna control system 470 includes features for determining an antenna beam steering command for a directional antenna according to example embodiments of the present disclosure. Antenna beam steering commands determined by antenna control system 470 can direct the transmission and reception of cellular signals between an aircraft and one or more ground communication nodes using an electronically controllable/steerable directional antenna mounted onboard the aircraft. In some examples, such a directional antenna can be externally mounted on the aircraft fuselage. Antenna control system 470 can include flight management and navigation system 472, antenna direction control unit 474, phased array antenna 476, and cell network database 478. In some embodiments, components of antenna control system 470 correspond with select components from avionics communication system 100 and include similar aspects described relative to FIG. 1. For example, antenna direction control unit 474 of FIG. 7 can perform some or all functions of the third computational algorithm 124 in computational platform 120 of FIG. 1. Phased array antenna 476 of FIG. 7 can perform some or all functions of the directional antenna 140 of FIG. 1. Cell network database 478 of FIG. 7 can include some or all of the informational data available within cell network database 114 of FIG. 1.

Antenna direction control unit 474 generally is configured to gather relevant directional data from the flight management and navigation system 472, phased array antenna 476 and cell network database 478 in order to determine antenna beam steering commands for the phased array antenna 476 at different periods of time. The antenna beam steering commands determined by the antenna direction control unit 474 can be based at least in part on the relative position of the aircraft identified from the flight management and navigation system 472, the current position of the phased array antenna 476 and the relative position of antennas or other communication component locations associated with selected ground communication nodes identified by cell network database 478.

Directional position of the various components depicted in the antenna control system 470 of FIG. 7 can be described in terms of yaw and roll angles. For example, Error! Reference source not found.phased array antenna 476 can be expected to have motion along its pitch and yaw moments ($\Theta$, $\Phi$), respectively. The antenna direction control module 474 can keep track of the current antenna orientation defined by a current antenna pitch angle and a current antenna yaw angle ($\Theta_{current}$, $\Phi_{current}$). The current aircraft orientation can be defined in terms of a current aircraft pitch angle and current aircraft yaw angle ($\Theta_{aircraft}$, $\Phi_{aircraft}$), which can be tracked via flight path information from the onboard flight management and navigation system 472. The current antenna orientation can be defined with respect to an aircraft, which can be further translated with respect to the ground by transforming the coordinate system of the antenna and aircraft to the coordinate system of the aircraft and the ground.

Cell network database 478 can include for each cell tower or other ground communication node with which an aircraft plans to communicate a current ground antenna orientation including a ground antenna pitch angle and ground antenna yaw angle ($\Theta_{ground}$, $\Phi_{ground}$) of the ground antennas located on the identified cell towers. The current ground antenna orientation ($\Theta_{ground}$, $\Phi_{ground}$) can be translated to a current target antenna orientation ($\Theta_{target}$, $\Phi_{target}$) by adding 180 degrees to the ground antenna pitch angle and the ground antenna yaw angle, respectively:

$$\Theta_{target} = \Theta_{ground} + 180°$$

$$\Phi_{target} = \Phi_{ground} + 180°$$

Antenna direction control unit 474 then can determine a resultant antenna orientation ($\Theta_{resultant}$, $\Phi_{resultant}$) based on the current antenna orientation ($\Theta_{current}$, $\Phi_{current}$) and current aircraft orientation ($\Theta_{aircraft}$, $\Phi_{aircraft}$), as follows:

$$\Theta_{resultant} = T_1(\Theta_{current}, \Phi_{aircraft})$$

$$\Phi_{resultant} = T_2(\Phi_{current}, \Phi_{aircraft}),$$

where the function $T_1$ is given by $$\tan^{-1}\left[\frac{\left[1-\frac{d}{L}\right]\sin(\theta_{aircraft})\cos(\theta_{antenna}) + \cos(\theta_{aircraft})\sin(\theta_{antenna}) + \tan(\theta_{antenna})[-\sin(\theta_{aircraft})\sin(\theta_{antenna}) + \cos(\theta_{aircraft})\cos(\theta_{antenna})]}{\left[1-\frac{d}{L}\right]\cos(\theta_{aircraft})\cos(\theta_{antenna}) - \sin(\theta_{aircraft})\sin(\theta_{antenna}) - \tan(\theta_{antenna})[\cos(\theta_{aircraft})\sin(\theta_{antenna}) + \sin(\theta_{aircraft})\cos(\theta_{antenna})]}\right]$$

and $T_2$ is given by $$\tan^{-1}\left[\frac{\sin(\phi_{aircraft})\cos(\phi_{antenna}) + \cos(\phi_{aircraft})\sin(\phi_{antenna}) + \tan(\phi_{antenna})[-\sin(\phi_{aircraft})\sin(\phi_{antenna}) + \cos(\phi_{aircraft})\cos(\phi_{antenna})]}{\cos(\phi_{aircraft})\cos(\phi_{antenna}) - \sin(\phi_{aircraft})\sin(\phi_{antenna}) - \tan(\phi_{antenna})[\cos(\phi_{aircraft})\sin(\phi_{antenna}) + \sin(\phi_{aircraft})\cos(\phi_{antenna})]}\right]$$

and where d is the distance to the antenna from the center of the aircraft and L is the length of the antenna. Antenna direction control unit 474 then can determine a required antenna orientation ($\Theta_{required}$, $\Phi_{required}$) based on the resultant antenna orientation ($\Theta_{resultant}$, $\Phi_{resultant}$) and the target antenna orientation ($\Theta_{target}$, $\Phi_{target}$) as follows:

$$\Theta_{required} = \Theta_{resultant} - \Theta_{target}$$

$$\Phi_{required} = \Phi_{resultant} - \Phi_{target}$$

The required antenna orientation ($\Theta_{required}$, $\Phi_{required}$) determined by antenna direction control unit 474 then can be used to control the direction of phased array antenna 476 for relaying signals transmitted and received between phased array antenna 476 and identified ground communication nodes with which the aircraft plans to communicate in a given period of time. As the aircraft transitions its communication to other ground communication nodes and changes its current orientation during flight, the various antenna orientation data and calculations determined by antenna control system 470 can be periodically updated and recalculated.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An avionics communication system located on an aircraft for providing cellular communication between the aircraft and an infrastructure of ground communication nodes, comprising:
 a directional antenna;
 one or more processors and one or more memory devices, the one or more memory devices storing instructions that when executed by the one or more processors cause the one or more processors to perform operations, the operations comprising:
  identifying one or more ground communication nodes with which the aircraft plans to communicate in a given period of time, wherein identifying the one or more ground communication nodes with which the aircraft plans to communicate in the given period of time comprises:
   determining a position of the aircraft during the given period of time;
   determining a relative velocity of the aircraft;
   determining a location of ground communication nodes; and
   selecting one or more ground communication nodes based at least in part on the determined position of the aircraft, the determined relative velocity of the aircraft and the determined location of ground communication nodes relative to the determined position and relative velocity of the aircraft;
  determining a signal power level for communicating between the aircraft and the one or more identified ground communication nodes; and
  determining a frequency shift value for modifying communicated signals to account for expected Doppler effects associated with the communicated signals due to a velocity of the aircraft relative to the identified one or more ground communication nodes; and
 a radio transmitter receiver configured to transmit and receive cellular communication signals between the aircraft and the identified one or more ground communication nodes using the directional antenna, determined signal power level and determined frequency shift value.

2. The avionics communication system of claim 1, wherein the operations further comprise determining an antenna beam steering command for the directional antenna, wherein the antenna beam steering command is based at least in part on the relative position of the aircraft to the identified one or more ground communication nodes with which the aircraft plans to communicate in the given period of time.

3. The avionics communication system of claim 1, further comprising:
 one or more navigation sensors configured to determine the position of the aircraft during the given period of time.

4. The avionics communication system of claim 1, wherein determining the location of ground communication nodes comprises accessing a database containing the location of each ground communication node, a capacity level associated with each ground communication node, a communication protocol type associated with each ground communication node and a state of availability of each ground communication node.

5. The avionics communication system of claim 1, wherein identifying the one or more ground communication nodes with which the aircraft plans to communicate in the given period of time further comprises identifying terrain characteristics between the aircraft and the identified one or more ground communication nodes, and wherein selecting one or more ground communication nodes is further based at least in part on the identified terrain characteristics.

6. A computer-implemented method of providing cellular communication between an aircraft and infrastructure of ground communication nodes, comprising:
 identifying, by one or more computing devices, one or more ground communication nodes with which the aircraft plans to communicate in a given period of time, wherein identifying the one or more ground communication nodes with which the aircraft plans to communicate in the given period of time comprises:
  determining, by the one or more computing devices, a position of the aircraft during the given period of time;
  determining, by the one or more computing devices, a relative velocity of the aircraft;
  determining, by the one or more computing devices, a location of known ground communication nodes; and
  selecting, by the one or more computing devices, the one or more ground communication nodes based at least in part on the determined position of the aircraft, the determined relative velocity of the aircraft, and the determined location of known ground communication nodes relative to the determined position and relative velocity of the aircraft;
 determining, by the one or more computing devices, a signal power level for communicating between the aircraft and the one or more identified ground communication nodes;
 determining, by the one or more computing devices, a frequency shift value for modifying communicated signals to account for expected Doppler effects associated with the communicated signals due to a velocity of the aircraft relative to the identified one or more ground communication nodes; and
 transmitting or receiving cellular communication signals between the aircraft and the identified one or more ground communication nodes using the determined signal power level and determined frequency shift value.

7. The computer-implemented method of claim 6, wherein identifying one or more ground communication nodes comprises identifying a plurality of ground communication nodes with which the aircraft plans to communicate in a given period of time such that multiple redundant communication paths are established between the aircraft and the plurality of ground communication nodes.

8. The computer-implemented method of claim 6, wherein identifying one or more ground communication nodes comprises identifying at least one ground communication node with which multiple connections will be established using one or more different cellular communication protocols such that multiple redundant communication paths are established between the aircraft and the at least one ground communication node.

9. The computer-implemented method of claim 6, wherein determining the location of known ground communication nodes comprises accessing a database containing the location of each ground communication node, a capacity level associated with each ground communication node, a communication protocol type associated with each ground communication node and a state of availability of each ground communication node.

10. The computer-implemented method of claim 6, wherein identifying the one or more ground communication nodes with which the aircraft plans to communicate in the given period of time further comprises identifying, by the one or more computing devices, terrain characteristics between the aircraft and the identified one or more ground communication nodes, and wherein selecting the one or more ground communication nodes is further based at least in part on the identified terrain characteristics.

11. The computer-implemented method of claim 6, wherein determining the position of the aircraft during the given period of time comprises receiving aircraft position signals from an aircraft navigation system.

12. The computer-implemented method of claim 6, wherein determining the position of the aircraft during the given period of time comprises accessing a predetermined flight plan for the aircraft.

13. The computer-implemented method of claim 6, wherein determining the position of the aircraft during the given period of time comprises determining a lateral and vertical position of the aircraft relative to the determined location of known ground communication nodes.

14. The computer-implemented method of claim 6, further comprising determining, by the one or more computing devices, an antenna beam steering command for a directional antenna, wherein the antenna beam steering command is based at least in part on the relative position of the aircraft to the identified one or more ground communication nodes with which the aircraft plans to communicate in the given period of time, and wherein transmitting or receiving cellular communication signals between the aircraft and the identified one or more ground communication nodes is performed in part with the directional antenna.

15. The computer-implemented method of claim 14, wherein the antenna beam steering command for the directional antenna comprises an antenna pitch angle and an antenna yaw angle determined relative to an aircraft pitch angle and an aircraft yaw angle.

16. The computer-implemented method of claim 6, wherein determining a signal power level for communicating between the aircraft and the one or more identified ground communication nodes is based at least in part on one or more of a determined distance between the aircraft and each of the identified one or more ground communication nodes with which the aircraft plans to communicate in the given period of time, a type of cellular technology used in communication, and an estimated amount of antenna gain.

17. The computer-implemented method of claim 6, wherein the one or more ground communication nodes comprise one or more cellular towers.

18. An aircraft, comprising:
a directional antenna;
one or more processors and one or more memory devices, the one or more memory devices storing instructions that when executed by the one or more processors cause the one or more processors to perform operations, the operations comprising:
identifying one or more ground communication nodes with which the aircraft plans to communicate in a given period of time, wherein identifying the one or more ground communication nodes with which the aircraft plans to communicate in the given period of time comprises:
determining a position of the aircraft during the given period of time;
determining a relative velocity of the aircraft;
determining a location of ground communication nodes; and
selecting one or more ground communication nodes based at least in part on the determined position of the aircraft, the determined relative velocity of the aircraft and the determined location of ground communication nodes relative to the determined position and relative velocity of the aircraft;
determining a signal power level for communicating between the aircraft and the one or more identified ground communication nodes;
determining a frequency shift value for modifying communicated signals to account for expected Doppler effects associated with the communicated signals due to a velocity of the aircraft relative to the identified one or more ground communication nodes; and
determining an antenna beam steering command for the directional antenna, wherein the antenna beam steering command is based at least in part on the relative position of the aircraft to the identified one or more ground communication nodes with which the aircraft plans to communicate in the given period of time; and
a radio transmitter receiver configured to transmit and receive cellular communication signals between the aircraft and the identified one or more ground communication nodes using the directional antenna, determined signal power level, determined frequency shift value, and determined antenna beam steering command.

19. The aircraft of claim 18, wherein determining the location of ground communication nodes comprises accessing a database containing the location of each ground communication node, a capacity level associated with each ground communication node, a communication protocol type associated with each ground communication node and a state of availability of each ground communication node.

20. The aircraft of claim 18, wherein identifying the one or more ground communication nodes with which the aircraft plans to communicate in the given period of time further comprises identifying terrain characteristics between the aircraft and the identified one or more ground communication nodes, and wherein selecting one or more ground communication nodes is further based at least in part on the identified terrain characteristics.

* * * * *